United States Patent
Yoon et al.

(10) Patent No.: US 7,127,045 B1
(45) Date of Patent: Oct. 24, 2006

(54) AUTOMATIC ANSWERING TELEPHONE SET WITH INDIVIDUAL ANSWERING AND METHOD THEREOF

(75) Inventors: Du Hyun Yoon, Seoul (KR); Kwang Su Kim, Choongcheongbuk-Do (KR)

(73) Assignee: LG Information and Communications Ltd., Seoul (KR)

( * ) Notice: Subject to any disclaimer, the term of this patent is extended or adjusted under 35 U.S.C. 154(b) by 0 days.

(21) Appl. No.: 09/562,473

(22) Filed: May 1, 2000

(30) Foreign Application Priority Data

Jun. 5, 1999    (KR)    ............................ 1999-20839

(51) Int. Cl.
*H04M 1/64* (2006.01)
(52) U.S. Cl. ..................................... 379/70; 379/88.22
(58) Field of Classification Search ............... 379/67.1, 379/88.16, 88.22, 88.23, 88.24, 372, 373.02, 379/373.05
See application file for complete search history.

(56) References Cited

U.S. PATENT DOCUMENTS

| | | | | |
|---|---|---|---|---|
| 4,791,664 A | * | 12/1988 | Lutz et al. | 379/199 |
| 4,797,912 A | * | 1/1989 | Hashimoto | 379/79 |
| 4,845,743 A | * | 7/1989 | Lutz | 379/199 |
| 5,432,844 A | * | 7/1995 | Core et al. | 379/171 |
| 5,550,900 A | * | 8/1996 | Ensor et al. | 370/485 |
| 5,623,537 A | * | 4/1997 | Ensor et al. | 370/271 |
| 5,651,055 A | * | 7/1997 | Argade | 379/142.06 |
| 5,661,788 A | * | 8/1997 | Chin | 379/142.01 |
| 6,233,330 B1 | * | 5/2001 | McClure et al. | 379/212.01 |
| 6,263,071 B1 | * | 7/2001 | Swan et al. | 379/199 |
| 6,347,133 B1 | * | 2/2002 | Galbreath | 379/67.1 |
| 6,359,970 B1 | * | 3/2002 | Burgess | 379/142.01 |

FOREIGN PATENT DOCUMENTS

| | | | |
|---|---|---|---|
| GB | 1536843 | * | 12/1978 |
| JP | 04-341037 | * | 11/1992 |
| JP | 05-153228 | * | 6/1993 |
| WO | WO 94/27394 | * | 11/1994 |

* cited by examiner

*Primary Examiner*—Fan Tsang
*Assistant Examiner*—Olisa Anwah
(74) *Attorney, Agent, or Firm*—Fleshner & Kim LLP.

(57) ABSTRACT

The present invention relates to an individual answering method for an automatic answering telephone set which can selectively ring the telephone when a call is received by distinguishing absent users from users who are at home. A plurality of individual answering mode setting buttons are provided and enable each user to individually set an automatic answering function. Also, the user can push an automatic answering mode setting button or individual answering mode setting button during a conversation to allow the caller to leave a voice message for another user.

19 Claims, 4 Drawing Sheets

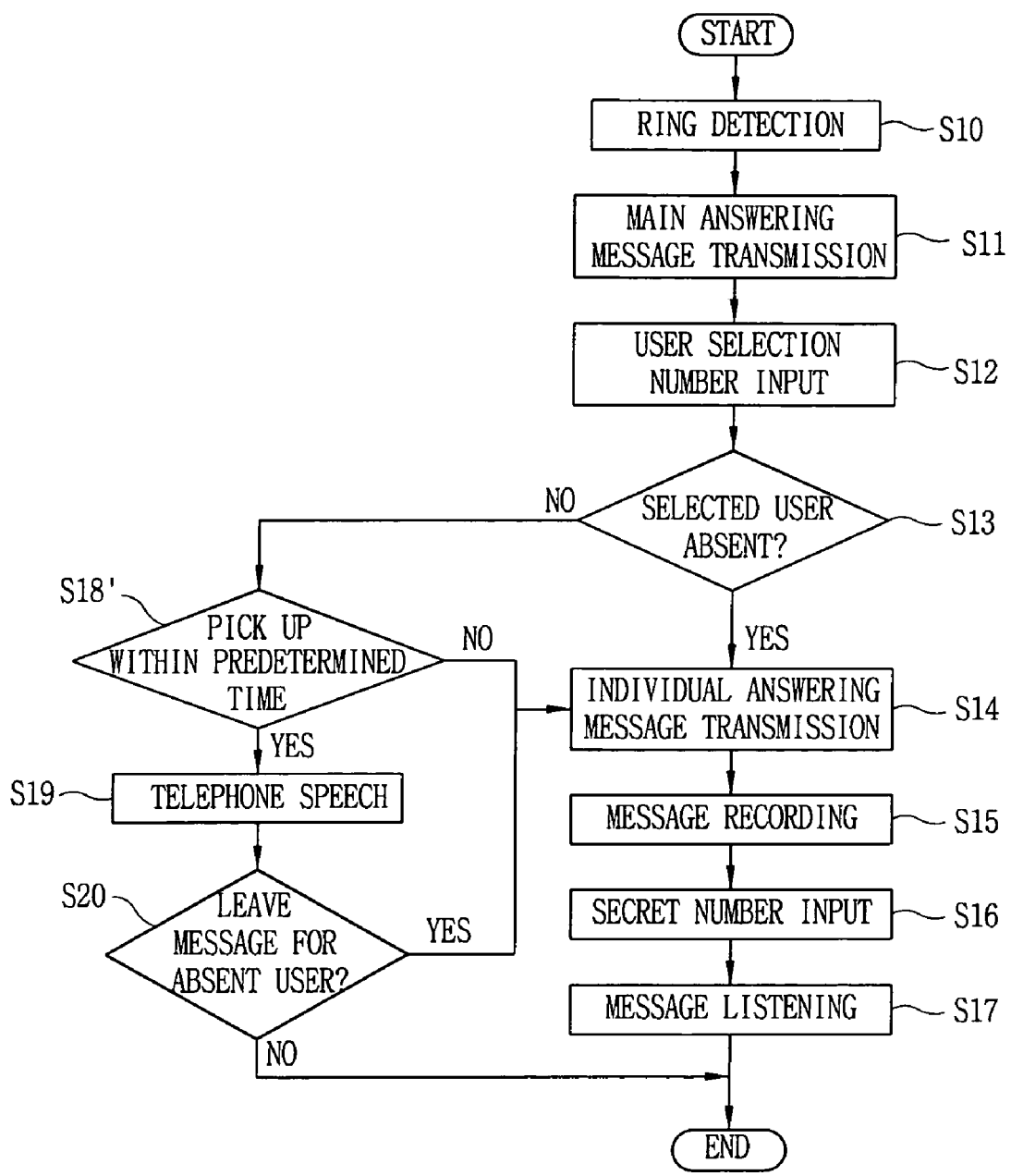

AUTOMATIC ANSWERING TELEPHONE SET WITH INDIVIDUAL ANSWERING AND METHOD THEREOF

BACKGROUND OF THE INVENTION

1. Field of the Invention

The present invention relates to a telephone, and in particular, an automatic answering telephone set and an individual answering method for an automatic answering telephone set.

2. Background of the Related Art

Automatic answering telephone sets provide various functions in order to ensure privacy of their users and provide convenience in a multi-user household. For example, a background art automatic answering telephone set divides recording regions for each user, and assigns secret numbers to the divided recording regions. Accordingly, a caller records a message to a wanted user, and the user selectively listens to the message by inputting his secret number or code.

FIG. 1 is a flowchart showing an automatic answering operation of a background art automatic answering telephone set, which is provided with a single automatic answering button. When one of the users pushes the automatic answering button, the automatic answering function is set. First, it is presumed that the automatic answering function is set in the automatic answering telephone set, and that users A, B, and C are all absent.

When a specific user, for example, the user A is called (S1), an answering message is transmitted to a caller under the control of a control unit (S2). Here, the answering message may indicate "push '1' to leave a message for user A, push '2' to leave a message for user B, or push '3' to leave a message for user C," or the like.

According to the answering message, the caller inputs '1' for user A, and leaves a message for user A. The message is sequentially recorded at the recording region for user A among the recording regions divided for each user A, B, C (S4). Thereafter, user A can input his secret number (S5), and listen to the message of the caller (S6).

However, it may happen that users A and B are absent and user C is at home, among the plurality of users A, B and C living together. In this case, whether or not the automatic answering function is set, the telephone set rings to notify user C of a telephone call regardless of whom the telephone call is intended for and even if user C does not want to be inconvenienced by calls that are not intended for him/her.

If the automatic answering function is not set, user C can answer the call or not answer the call. If user C answers the call, user C is inconvenienced by calls for users A and B and further inconvenienced by taking messages from the caller on a piece of paper and user C has to remember to give the message to user A or B. However, is user C decides not to answer the call, he/she may miss telephone calls intended for him/her.

If the automatic answering function is set, user C can answer the call or not answer the call. Again, if the call is not for user C and user C answers the call, he/she is inconvenienced and if the caller wants to leave a message for user A or B, user C has to write the message and remember to give the message. However, if user C decides not to answer the call, the generic answering message is played to the caller, and the caller can leave a message.

If user C is curious to find out whether the call is intended for him/her, user C has to listen to the generic answering message and wait until the caller starts to record the message. If user C recognizes the caller's voice, user C can stop the recording by answering the call. However, such call screening may sometime irrate the caller, especially if the call is important, and user C is inconvenienced by waiting until the recording process starts. Moreover, if user C does not recognize the caller's voice, he/she may not realize the call is intended for him/her.

In addition, a caller informed by user C that user A or B is absent may want to leave a message for user A or B, instead of speaking to user C. However, the background art automatic answering telephone set is not provided with a function of converting a speech mode into a message recording mode, and thus the caller cannot record a message. As described above, user C has to write the message onto a piece of paper, and remember to give the message to user A or B.

On the other hand, although the individual answering mode is set in the automatic answering telephone set, user C may not be able to answer the telephone because he/she is busy. Even if the caller calls user C on urgent business, he/she has to leave a recording message according to the answering message, instead of speaking to user C who is at home.

As described above, the background art automatic answering telephone set is not provided with a function of distinguishing the absent users from the users who are at home and ringing the telephone appropriately. Nor is it provided with a function of converting speech mode into message recording mode. As a result, the users must willingly submit to privacy invasion and inconvenience when living in a multi-user household.

SUMMARY OF THE INVENTION

An object of the invention is to solve at least the above problems and/or disadvantages and to provide at least the advantages described hereinafter.

Accordingly, it is an object of the present invention to provide an individual answering method for an automatic answering telephone set whose users can individually set an automatic answering function.

It is another object of the present invention to provide an individual answering method for an automatic answering telephone set which can ring the telephone, by distinguishing absent users from users who are at home.

It is still another object of the present invention to provide an individual answering method for an automatic answering telephone set which enables a caller to record a voice message during speech, by converting a speech mode into a message recording mode.

In order to achieve the above-described objects of the present invention, there is provided an individual answering method for an automatic answering telephone set, including: storing an individual answering mode setting state of a user indicative of whether the user is present or absent; transmitting a main answering message to a caller when receiving a ring signal, and receiving a user identification code from the caller; and selectively outputting an individual answering message and an indicator by judging the absence of the user based on the stored individual answering mode state corresponding to the user identification code.

In addition, in order to achieve the above-described objects of the present invention, there is provided an individual answering method for an automatic answering telephone set, including: storing individual answering mode setting states for each of a plurality of users, each indicative of whether a user is present or absent; checking whether the plurality of users are all absent, on the basis of the stored individual answering mode setting states, when a ring signal is detected; converting a speech mode into a message recording mode, when all the users are absent, and outputting an indicator detectable by one of the plurality of users when at least one user is not absent; detecting an input of an answering mode setting button when a user who is not absent answers the telephone set; and converting the speech mode into the message recording mode when the input of the answering mode setting button is detected.

It is another object of the invention to provide a telephone set for automatically answering an incoming call. The telephone set has a microphone; an indicator that when activated is detectable by one of a plurality of users; an individual answering mode setting device for each of the plurality of users indicative of whether a corresponding user is present or absent; memory for storing an answering message, a user identification code for each of the plurality of users, a plurality of individual answering mode setting states inputted by the users, and a message left by a caller; and a control unit. The control unit determines a particular user identification code inputted by a caller, transmits the caller an answering message if the individual answering mode setting state corresponding to the particular user identification code indicates that the user corresponding to the particular user identification code is absent, and activates the indicator if the individual answering mode setting state corresponding to the particular user identification code indicates that the user corresponding to the particular user identification code is present.

It is another object of the invention to provide a telephone set for automatically answering an incoming call, including: a microphone; an indicator that when activated is detectable by one of a plurality of users; an individual answering mode setting device for each of the plurality of users indicative of whether a corresponding user is present or absent; memory for storing an answering message, a user identification code for each of the plurality of users, a plurality of individual answering mode setting states inputted by the users, and a message left by a caller; and a control unit that determines whether the plurality of users is absent based on their corresponding individual answering mode setting states, and, if the plurality of users is absent, determines an inputted user identification code, transmits to a caller an answering message corresponding to the inputted user identification code, and, if one of the plurality of users is not absent, activates the indicator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3B is an alternate embodiment of the method shown in FIG. 3A; and

DETAILED DESCRIPTION OF PREFERRED EMBODIMENTS

Figure 1:
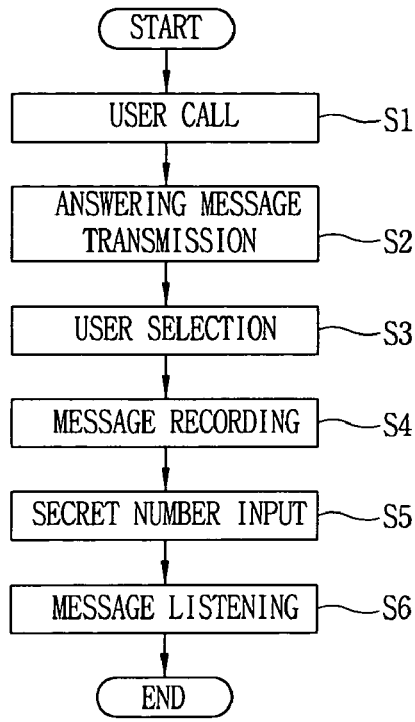
FIG. 1 is a flowchart showing an automatic answering operation of a background art automatic answering telephone set.
Figure 2:
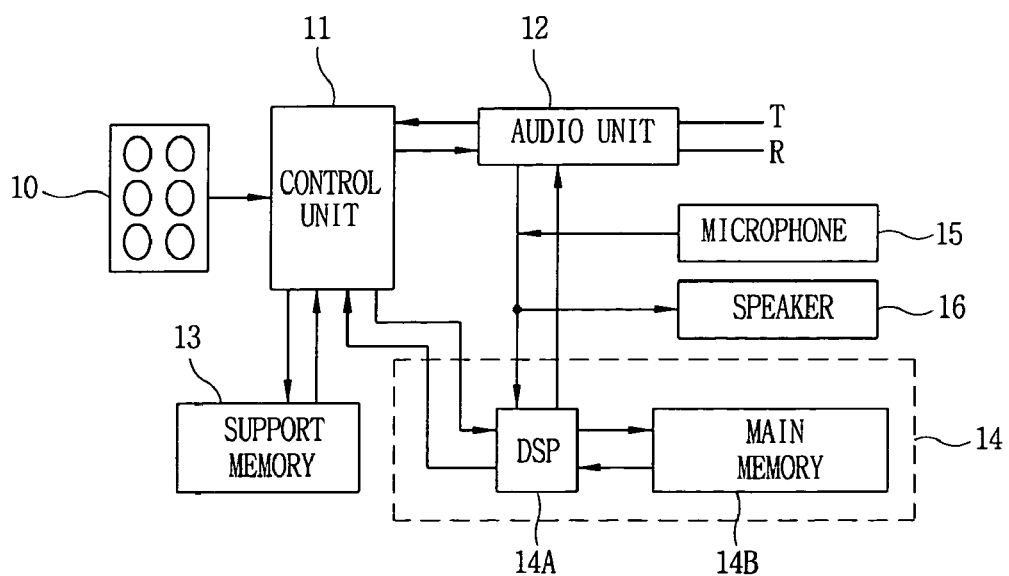
FIG. 2 is a structure view illustrating an automatic answering telephone set in accordance with the present invention.

FIG. 2 illustrates an automatic answering telephone set in accordance with a preferred embodiment of the present invention. A key input unit 10 is used by each user to set an individual answering mode or automatic answering setting mode, and a control unit 11 carries out various control operations of the automatic answering telephone set. An audio unit 12 processes a transmitted/received voice signal, and a support memory 13 stores an address of a memory region assigned to each user and the individual answering mode setting states of each user. An automatic answering unit 14 transmits a stored main answering message and a stored individual answering message to a caller, and stores a voice message of the caller. A microphone 15 records the main answering message and the individual answering message in the automatic answering unit 14, and a speaker 16 reproduces the recorded answering messages.

The key input unit 10 includes a plurality of individual answering mode setting buttons corresponding to a plurality of users, in addition to a background art automatic answering mode setting button.

The automatic answering unit 14 includes: a digital signal processor (DSP) 14A converting a voice signal into a digital signal, and a digital signal into a voice signal; and a main memory 14B storing the main answering message, the individual answering messages and the caller's voice message. Here, the main memory 14B includes a plurality of storage regions assigned to each user. The main answering message, the individual answering messages and the caller's voice message are separately stored in the respective storage regions In the following description of an example of the operation of an automatic answering telephone set in accordance with the present invention, it is presumed that the number of the automatic answering telephone set users is three, namely A, B and C, but any number of users greater than 1 is applicable.

First, the users record the main answering message and the individual answering messages in the automatic answering unit 14 by using the microphone 15. The main answering message is an answering message which is transmitted at an initial stage when a call is received, and which may have contents such as: "push '1' if you want to speak to user A, push '2' if you want to speak to user B, or push '3' if you want to speak to user C". Each individual answering message is an answering message which is transmitted when the caller selects a specific user, and may have contents such as: "Thanks for calling. This is A. I cannot answer the phone at this time. Please leave a message".

When the users input the main answering message and the individual answering messages, the voice signal outputted from the microphone 15 is converted into digital code in the DSP 14A, and stored in a specific region of the main memory 14B. The addresses of the respective storage regions are stored in the support memory 13 through the control unit 14.

Once the main answering message and the individual answering messages are recorded, each user pushes his/her individual answering mode setting button provided in the key input unit 10 before going out, thereby setting the individual answering mode. When the individual answering mode is set, the control unit 11 stores the individual answering mode setting states of the users in the support memory 13. Thereafter, when a telephone call is received, the control unit 11 reads the addresses of the main answering message and the individual answering messages from the support memory 13 according to an output from a ring detection unit (not shown), and accesses the main memory 14B. Accordingly, the main answering message and the individual answering messages stored in the main memory 14B are converted into digital codes in the DSP 14A, and transmitted to the caller through the audio unit 12.

The caller inputs the identification number of the wanted user, responding to the main answering message, and transmits the voice message to the selected user, responding to the individual answering message. Therefore, the transmitted voice message is stored in the recording region of the selected user in the main memory 14B through the audio unit 12 and the DSP 14A, and an address corresponding to the storage position is stored in the support memory 13 through the control unit 11. Accordingly, the selected user inputs his/her secret number, and listens to the message left by the caller.

Figure 3A:
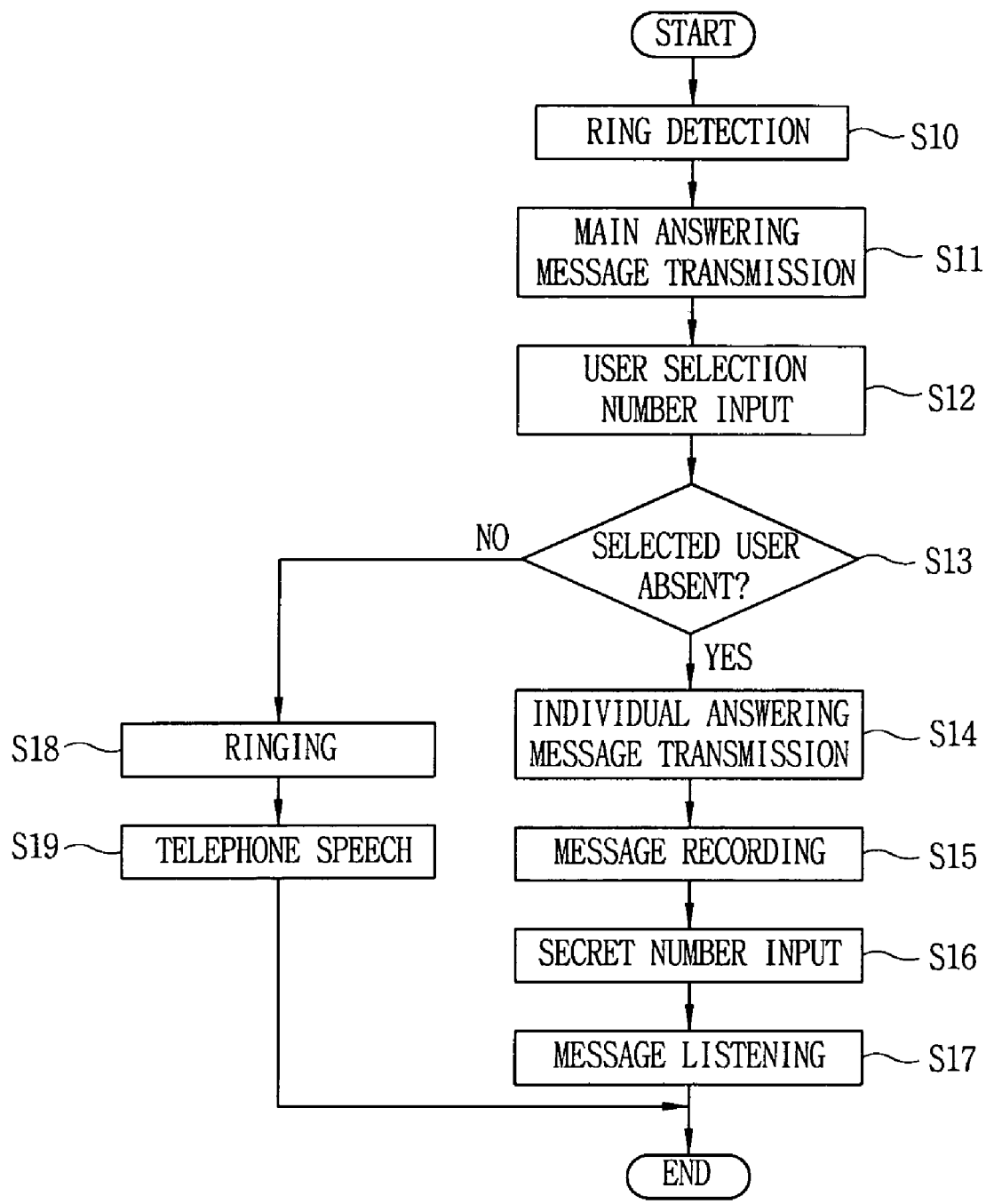
FIG. 3A is a flowchart showing an individual answering method for the automatic answering telephone set in accordance with a first embodiment of the present invention.

FIGS. 3A and 3B are flowcharts showing an individual answering mode setting method for the automatic answering telephone set in accordance with a first embodiment of the present invention.

When a call is received, the ring detection unit detects the ring signal, and outputs it to the control unit 11 (S10) but the ringing of the telephone is prevented. The control unit 11 reads the address of the main answering message from the support memory 13, and accesses the main memory 14B. The accessed main answering message is converted into the digital code in the DSP 14A, and transmitted to the caller through the audio unit 12 (S11).

As a result, the caller hears the main answering message: "push '1' if you want to speak to user A, push '2' if you want to speak to user B, or push '3' if you want to speak to user C" through the speaker 16. When the caller pushes the identification number of the specific user, responding to the main answering message (S12), the DSP 14A of the automatic answering unit 14 detects the user identification number through the audio unit 12, and outputs it to the control unit 11. Thus, the control unit 11 accesses the answering mode setting state of the user from the support memory 13, and judges whether the user corresponding to the identification number is currently absent or not (S13).

For example, in the case that the caller inputs the identification number '1', the control unit 11 recognizes that user A corresponding to the identification number '1' is absent, on the basis of the individual answering mode setting states stored in the support memory 13. The control unit 11 then reads the address of the individual answering message from the support memory 13, and outputs it to the main memory 14B. As a result, the individual answering message outputted from the main memory 14B is transmitted to the caller through the DSP 14A and the audio unit 12 (S14). The caller hears the individual answering message: "Thanks for calling. This is A. I cannot answer the phone at this time. Please leave a message" through the speaker 16.

When the caller transmits the voice message to user A after hearing the individual answering message, the transmitted voice message is stored in the main memory 14B through the audio unit 12 and the DSP 14A, and the storage position thereof is stored in the support memory 13. Accordingly, user A can input his/her secret number, and listen to the message left by the caller (S16), (S17).

On the other hand, when the caller inputs "3", the control unit 11 recognizes that user C is at home, based on the individual answering mode setting states stored in the support memory 13, and controls the speaker 16 to ring the telephone (S18). Accordingly, user C can determine that the call is intended for him/her, and answer the telephone call (S19). The telephone may ring indefinitely until the user C answers or the caller hangs up FIG. 3A) or may transfer the caller to the individual answering message of user C if user C does not answer the phone within a certain number of rings (S18', FIG. 3B). Therefore, if user C decides that he/she does not want to answer the call, user C can let the telephone set ring at least the prescribed number of rings, initiating steps (S14) and (S15), indicating user C is not available. Moreover, as shown in FIG. 3B, if the caller wants to leave a message for absent user A or B, after talking to user C, user C can press an individual answer message button (S20) for user A or B, and the caller is transferred to the individual answering message of user A or B (S14).

In the individual answering mode setting method for the automatic answering telephone set in accordance with the first embodiment of the present invention, the users can individually set the answering mode, and thus it is possible to distinguish the absent users from the users who are at home and ring the telephone accordingly. As a result, the users who are at home are not bothered by the calls for the absent users. Further, the user(s) who is at home has a choice of answering or not answering calls intended for him/her.

Figure 4:
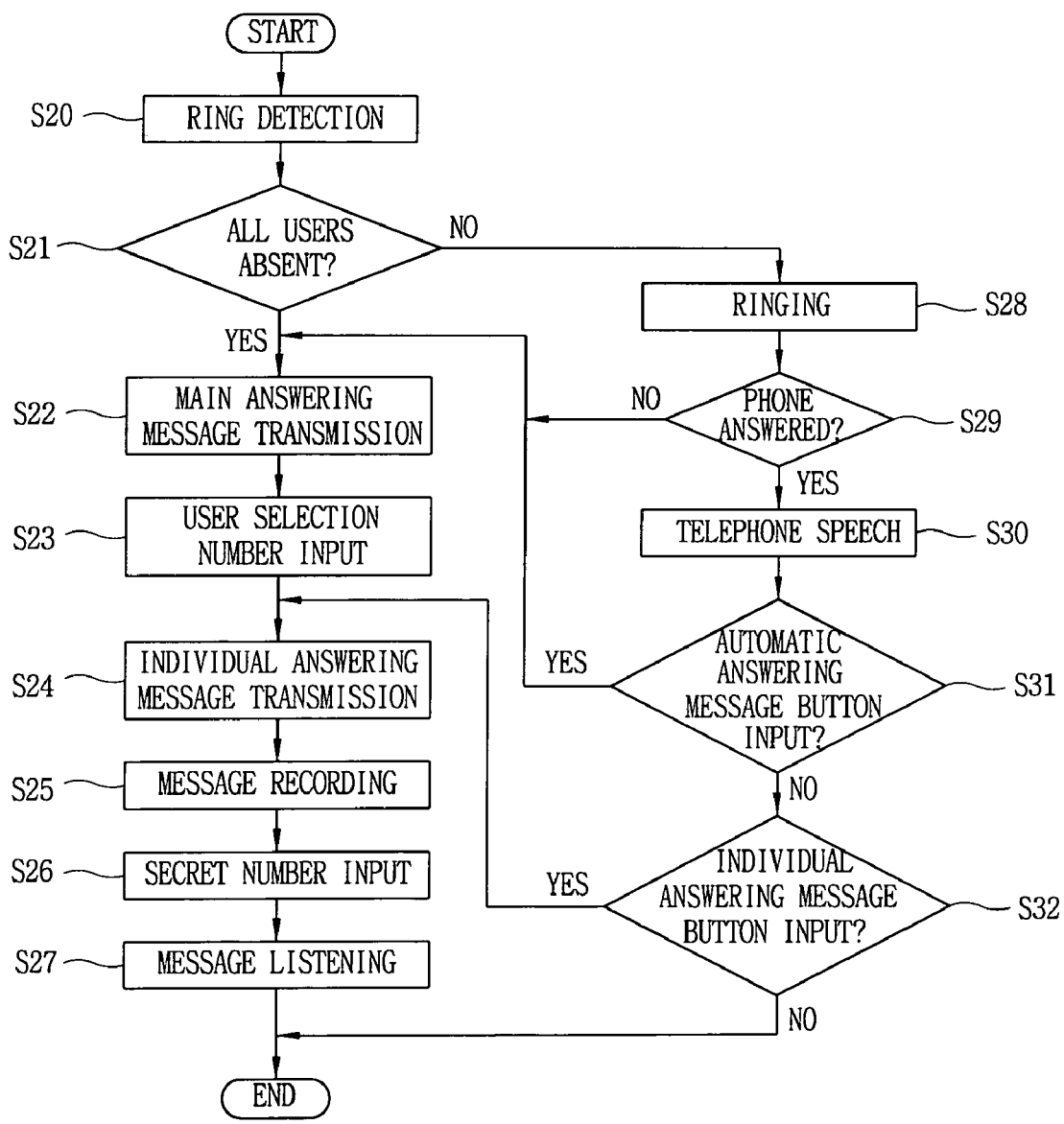
FIG. 4 is a flowchart showing an individual answering method for the automatic answering telephone set in accordance with a second embodiment of the present invention.

FIG. 4 is a flowchart showing an individual answering mode setting method for the automatic answering telephone set in accordance with a second embodiment of the present invention.

When a ring signal is detected by the ring detection unit (S20), the control unit 11 checks whether the users are all absent, on the basis of the individual answering mode setting states stored in the support memory 13 (S21).

When all the users are absent, the control unit 11 reads the address of the main answering message from the support memory 13, and accesses the main memory 14B. The main answering message outputted from the main memory 14B is transmitted to the caller through the DSP 14A and the audio unit 12 (S22), and the caller pushes, for example, the identification number of user C, '3', according to the main answering message (S23).

When the identification number of the user C, '3', is inputted, the control unit 11 reads the address of C's individual answering message from the support memory 13, and accesses the main memory 14B. The individual answering message of user C, outputted from the main memory 14B, is transmitted to the caller through the DSP 14A and the audio unit 12 (S24). Accordingly, the caller hears the individual answering message and records the voice message for user C (S25). User C inputs his/her secret number, and listens to the message left by the caller (S26), (S27).

On the other hand, when the users are not all absent, namely absent users A and B set the individual answering mode and user C does not set the individual answering mode, the control unit 11 controls the speaker 16 to ring the telephone when user C is chosen by the caller, and judges whether the user answers the phone (S28), (S29). Here, the reception state of the phone can be discriminated by the ON/OFF state of a hook switch (not shown).

When the user does not answer the phone within a predetermined time lapse, for example, three rings, the control unit 11 accesses the support memory 13 and the main memory 14B, and sequentially performs the recording operation, starting from the main answering message transmission step (S22–S25), as described above.

Conversely; if user C answers the phone, the control unit 11 controls the audio unit 12. Accordingly, when the caller wants to speak to user A who is absent, not user C, the caller can require user C to transmit a message or record a voice message.

When required to transmit the message or record the voice message by the caller, user C pushes the automatic answering mode setting button or individual answering mode setting button provided in the key input unit 10. The control unit 11 checks whether the automatic answering mode setting button is pushed during the conversation (S31). When it is detected that the automatic answering mode setting button has been pushed during the conversation, the control unit 11 sequentially performs the recording operation, starting from the main answering message transmission step (S22–S25), as described above.

Conversely, when it is not detected that the automatic answering mode setting button has been pushed during the conversation, the control unit 11 checks whether the individual answering mode setting button has been pushed during the conversation through the key input unit 10 (S32). If it is detected that the individual answering mode setting button has been pushed during the conversation, the control unit 11 sequentially performs the recording operation, starting from the individual answering message transmission step (S24), (S25), as described above. When it is not detected that the individual answering mode setting button has been pushed during the conversation, the control unit 11 finishes the whole operation. It is preferable that the individual answering mode setting state of the user for which the caller wants to leave a message (A in this example) is unaffected by C pushing A's individual answering mode setting button to permit the caller to leave A a message.

In the individual answering mode setting method for the automatic answering telephone set in accordance with the second embodiment of the present invention, the user can individually set the automatic answering function, and convert the conversation or state into the message recording mode by using the automatic answering mode and individual answering mode setting buttons.

As discussed above, in accordance with the present invention, the users can individually set the automatic answering button by using the plurality of individual answering mode setting buttons provided in the key input unit. In addition, when a call is received, the telephone rings by distinguishing the absent users from the users who are at home.

Moreover, in accordance with the present invention, the user can convert the conversation or speech mode into the message recording mode by using the automatic answering mode setting button or the individual answering mode setting button, while speaking to the caller.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A telephone set, comprising:
   a plurality of individual answering mode setting buttons, each button dedicated to a single one of a plurality of users;
   a first memory to store an individual answering mode setting state for each of the plurality of users, each state set by a respective one of the individual answering mode setting buttons and indicative of whether a respective one of said users is present or absent; and
   a controller to check whether the users are all absent based on the stored individual answering mode setting states when a ring signal is detected, to switch from a speech mode to a message recording mode when all the users are absent, and to control a detectable indicator when at least one of the users is not absent,
   wherein, when at least one of the users is not absent, the control unit:
   detects an input of at least one of the answering mode setting buttons when the user who is not absent answers the telephone set; and
   switches from the speech mode to the message recording mode when the input of the at least one answering mode setting button is detected.

2. The telephone set of claim 1, wherein a main answering message is output when the input of the at least one answering mode setting button is detected.

3. The telephone set of claim 1, wherein an individual answering message is outputted when the input of the at least one answering mode setting button is detected.

4. The telephone set according to claim 1, wherein the control unit converts the speech mode into the message recording mode when the user who is not absent does not answer the telephone set for a predetermined time period.

5. A telephone set for automatically answering an incoming call, comprising:
   a microphone;
   an indicator that when activated is detectable by one of a plurality of users;
   an individual answering mode setting device including a plurality of individual answering mode setting buttons, each button setting a state indicative of whether a corresponding one of a plurality of users is present or absent and each button is dedicated to a single one of the users;
   a memory for storing an answering message, a user identification code for each of the users, the states set by the individual answering mode setting buttons input for the users, and a message left by a caller; and
   a control unit that detects an identification code input by a caller, determines whether a user corresponding to the identification code is absent based on the individual answering mode setting state corresponding to the user stored in the memory, and controls a detectable indicator based on whether the user is absent,
   wherein the control unit output an answering message to the caller if the individual answering mode setting state corresponding to the identification code indicates that the corresponding user is absent, and activates the indicator if the individual answering mode setting state corresponding to the identification code indicates that the corresponding user is present.

6. The telephone set of claim 5, wherein the activated indicator makes the sound of a telephone ringing.

7. The telephone set of claim 5, wherein the memory is for storing a main answering machine.

8. The telephone set of claim 5, wherein the memory is for storing an individual answering message for each of the plurality of users.

9. The telephone set of claim 5, further comprising:
an automatic answering mode device,
wherein the control unit outputs a main answering message to the caller, receives from the caller the identification code, and outputs to the call an individual answering message that corresponds to identification code if the individual answering mode setting state corresponding to the identification code indicates that the corresponding user is absent, and a non-absent one of the users sets the automatic answering mode device.

10. The telephone set of claim 5, further comprising a digital signal processor for converting voice signals to digital signals and digital signals to voice signals,
wherein the digital signal processor is electrically positioned between the controller and the memory.

11. A telephone set for automatically answering an incoming call, comprising:
a microphone;
a detectable indicator;
an individual answering mode setting device including a plurality of buttons, each button setting a state indicative of whether a corresponding one of a plurality of users is present or absent and each button is dedicated to a single one of the users;
a memory for storing an answering message, an identification code for each of the plurality of users, the states set by the individual answering mode setting buttons input for the users, and a message left by a caller; and
a control unit that determines whether the plurality of users is absent based on their corresponding individual answering mode states and controls a detectable indicator based on whether the user is absent, and
if the plurality of users are absent, determines an input identification code, transmits an answering message to the caller corresponding to the input identification code, and
if one of the plurality of users is not absent, activates the indicator.

12. The telephone set of claim 11, wherein the control unit records a message of the caller when the indicator is activated and the telephone set is answered by the non-absent user.

13. The telephone set of claim 12, wherein the control unit outputs a main answering message to the caller when the non-absent user presses an automatic answering message button.

14. The telephone set of claim 12, wherein the control unit outputs an individual answering message when the non-absent user presses one of the individual answering message buttons.

15. The telephone set of claim 1, wherein the stored individual answering mode setting states are unrelated to any remote calling, paging, or notification function.

16. The telephone set of claim 1, wherein when the control unit determines that a user is absent based on a corresponding stored individual answering mode setting state, a caller's message is stored in the message recording mode for said user without any audible signal generated from a speaker of the telephone set.

17. The telephone set of claim 1, further comprising:
storing a message input during the message recording mode in a second memory different from the first memory.

18. The telephone set of claim 17, wherein the first memory further stores:
an address of a memory region storing a main answering message; and
addresses of memory regions storing individual answering messages of the plurality of users.

19. The telephone set of claim 1, wherein each of the individual answering mode setting buttons sets a value for storage in the first memory that corresponds to the individual answering mode setting state indicating whether a corresponding one of the users is present or absent.

* * * * *